United States Patent
Hoang et al.

(10) Patent No.: US 11,418,927 B2
(45) Date of Patent: Aug. 16, 2022

(54) DUAL RADIO PUSH TO TALK SYSTEM

(71) Applicant: Safariland, LLC, Jacksonville, FL (US)

(72) Inventors: Peter Hoang, Corona, CA (US); John Brad Medine, Chino, CA (US); David Trinh Le, Irvine, CA (US)

(73) Assignee: Safariland, LLC, Jacksonville, FL (US)

( * ) Notice: Subject to any disclaimer, the term of this patent is extended or adjusted under 35 U.S.C. 154(b) by 0 days.

(21) Appl. No.: 17/155,296

(22) Filed: Jan. 22, 2021

(65) Prior Publication Data
US 2021/0235234 A1  Jul. 29, 2021

Related U.S. Application Data

(60) Provisional application No. 62/965,351, filed on Jan. 24, 2020.

(51) Int. Cl.
*H04W 4/10* (2009.01)
*H04M 1/05* (2006.01)

(52) U.S. Cl.
CPC .............. *H04W 4/10* (2013.01); *H04M 1/05* (2013.01)

(58) Field of Classification Search
CPC ..... H04W 4/10; H04W 84/08; H04M 1/0258; H04M 1/05
See application file for complete search history.

(56) References Cited

U.S. PATENT DOCUMENTS

| | | | |
|---|---|---|---|
| 8,798,659 B2* | 8/2014 | Lassally | H04B 1/3833 455/518 |
| 9,232,366 B1 | 1/2016 | Charlier et al. | |
| 9,503,867 B2 | 11/2016 | Wong | |
| 10,251,030 B2 | 4/2019 | Morse et al. | |
| 10,314,355 B1* | 6/2019 | Gallo | A41F 1/00 |
| 2006/0205416 A1* | 9/2006 | Kayzar | H04M 1/27475 455/456.1 |
| 2008/0026700 A1* | 1/2008 | Smith | H04B 1/44 455/90.2 |
| 2012/0064845 A1* | 3/2012 | Smith | H04R 1/1041 455/90.2 |
| 2016/0212537 A1* | 7/2016 | Hernandez | H04R 1/1041 |
| 2018/0109277 A1* | 4/2018 | Ooi | G08B 25/016 |
| 2019/0274022 A1* | 9/2019 | Escobar K'David | H04W 4/10 |

* cited by examiner

*Primary Examiner* — Raymond S Dean

(74) *Attorney, Agent, or Firm* — Kane Kessler, P.C.; Paul E. Szabo; Barry E. Negrin

(57) ABSTRACT

A dual radio PTT system includes two PTT buttons that are located on two separate elements, such as small boxes, that are connected by separate cables to the radio interface box. The PTT buttons, can, if desired, be physically placed (located) on the user's body at one or more locations different from the electrical interface box.

15 Claims, 4 Drawing Sheets

DUAL RADIO PUSH TO TALK SYSTEM

RELATED APPLICATIONS

This application claims priority from U.S. Provisional Application No. 62/965,351, filed Jan. 24, 2020, titled "Dual Radio Push To Talk System", the disclosure of which is incorporated by reference herein.

BACKGROUND OF THE INVENTION

Some headsets, for example as used by military and law enforcement officers, are capable of connecting to two different radio systems (signals) at the same time. For example, one radio system may be for communications within a local group, and another radio system may be for communications external to the group. With such headsets, the user needs to be able to talk (transmit) on either one radio or the other, without crossover.

Prior art dual radio headsets typically include a radio interface box that serves to connect the two radio signals to the headset. The interface box has two push to talk ("PTT") buttons on the box, one for each radio channel. The two buttons are of different colors to distinguish them. The user typically positions the interface box for easy manual access to the PTT buttons, for example, on the front of the user's torso. However, it is becoming common that the user wears a tablet on the user's chest. This placement of the tablet may interfere with placing the electrical interface box on the front of the user's torso.

SUMMARY OF THE INVENTION

In accordance with the invention, a dual radio PTT system includes two PTT buttons that are located on two separate elements, such as small boxes, that are movably connected by separate cables to the radio interface box. The PTT buttons, which are the portions of the system that need to be manually accessed by the user, can, if desired, be physically placed (located) on the user's body at one or more locations different from the electrical interface box.

In one embodiment, the invention relates to a dual radio PTT system for a headset, including a radio interface unit that is configured for connection with a first radio to receive signals from and transmit signals to the first radio and that is configured for connection with a second radio to receive signals from and transmit signals to the second radio. The interface unit also is configured for connection with a headset. A first PTT unit is electrically connected with the interface unit for controlling communication with the first radio. A second PTT unit is electrically connected with the interface unit for controlling communication with the second radio.

In one embodiment, the first and second PTT units are physically separate elements from the interface unit and are connected by separate cables to the interface unit.

In one embodiment, each one of the first and second PTT units includes structure for connecting it to the other one of the first and second PTT units.

In one embodiment, each one of the first and second PTT units includes structure for connecting it to a user's clothing.

BRIEF DESCRIPTION OF THE DRAWINGS

Further features of the invention will become apparent to one of ordinary skill in the art to which the invention pertains, from a reading of the following description together with the accompanying drawings, in which.

DESCRIPTION OF EMBODIMENTS OF THE INVENTION

Figure 1:
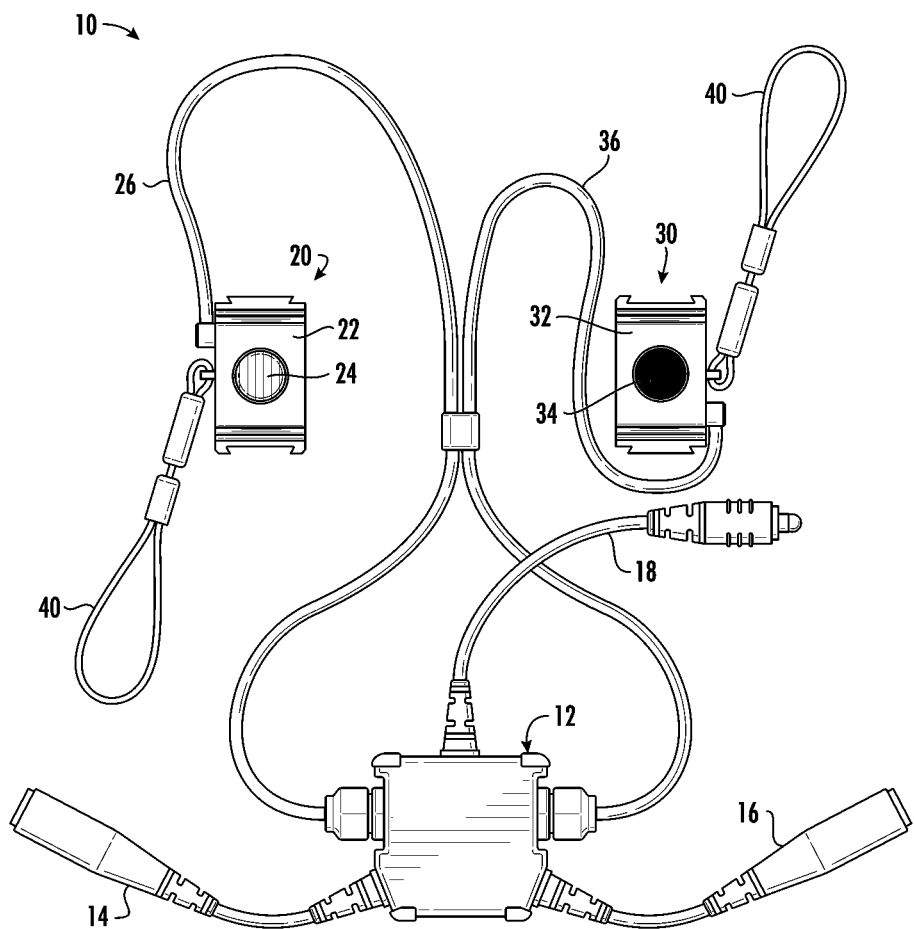
FIG. 1 illustrates a dual radio PTT system in accordance with a first embodiment of the invention, including two separate PTT units.

The present invention relates to a dual radio push to talk ("PTT") system. The invention is applicable to various and different PTT systems. As representative of the invention, the Figures illustrate a PTT system 10 that is a first embodiment of the invention.

The system 10 includes a central electrical interface box 12, or interface unit 12, that has a number of wires or cables extending from it. One cable 14 connects to the first radio (not shown), to receive signals from the first radio and transmit signals to the first radio. This cable 14 may be colored red to distinguish it. A second cable 16 connects to the second radio (not shown), to receive signals from the second radio and transmit signals to the second radio. This cable 16 may be colored black to distinguish it. A third cable 18 connects to the headset (not shown).

The system includes two individual PTT units 20 and 30 that are physically separate items from the interface unit 12.

One PTT unit 20 is a box-shaped element 22 that has a PTT button 24 that is colored red. This first PTT unit 20 is connected by a first PTT cable 26 to the interface unit 12.

The second PTT unit 30 is a box-shaped element 32 that has a PTT button 34 that is colored black. This second PTT unit 30 is connected by its own separate PTT cable 36 to the interface unit 12.

Figure 2:
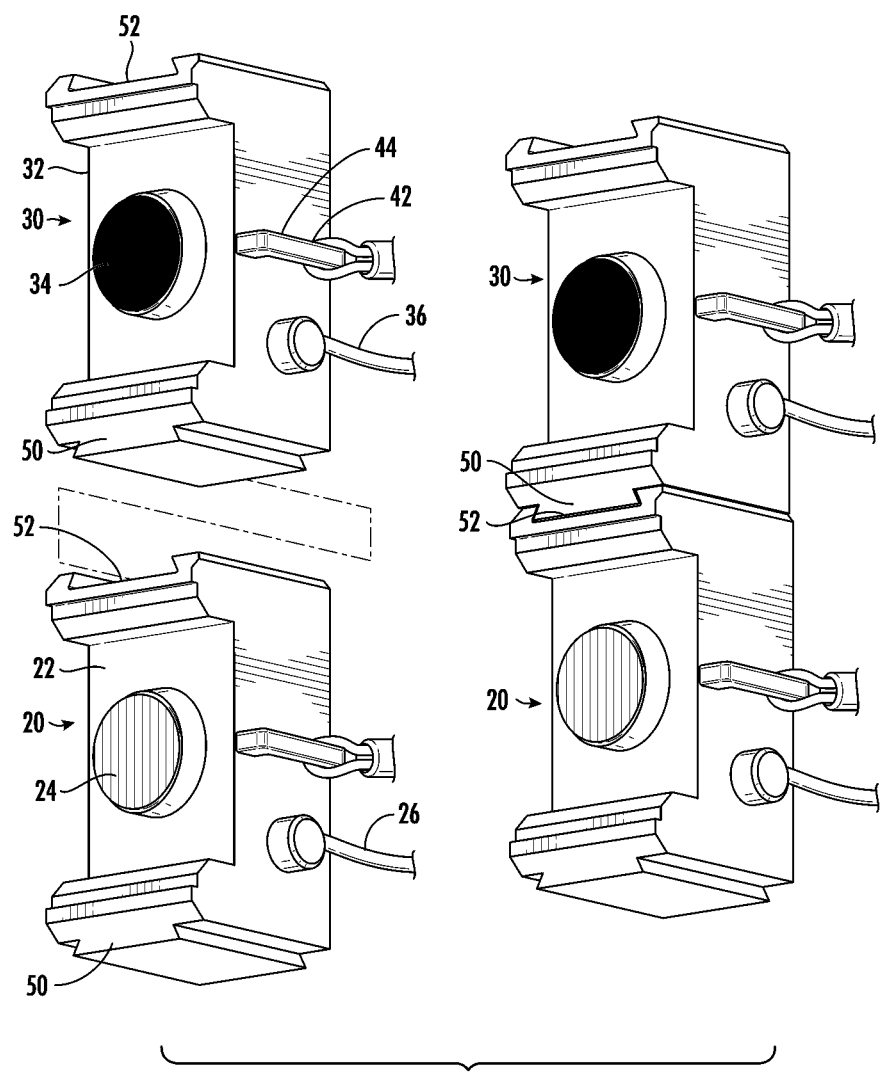
FIG. 2 illustrates one method of connecting the two separate PTT units to each other.
Figure 3:
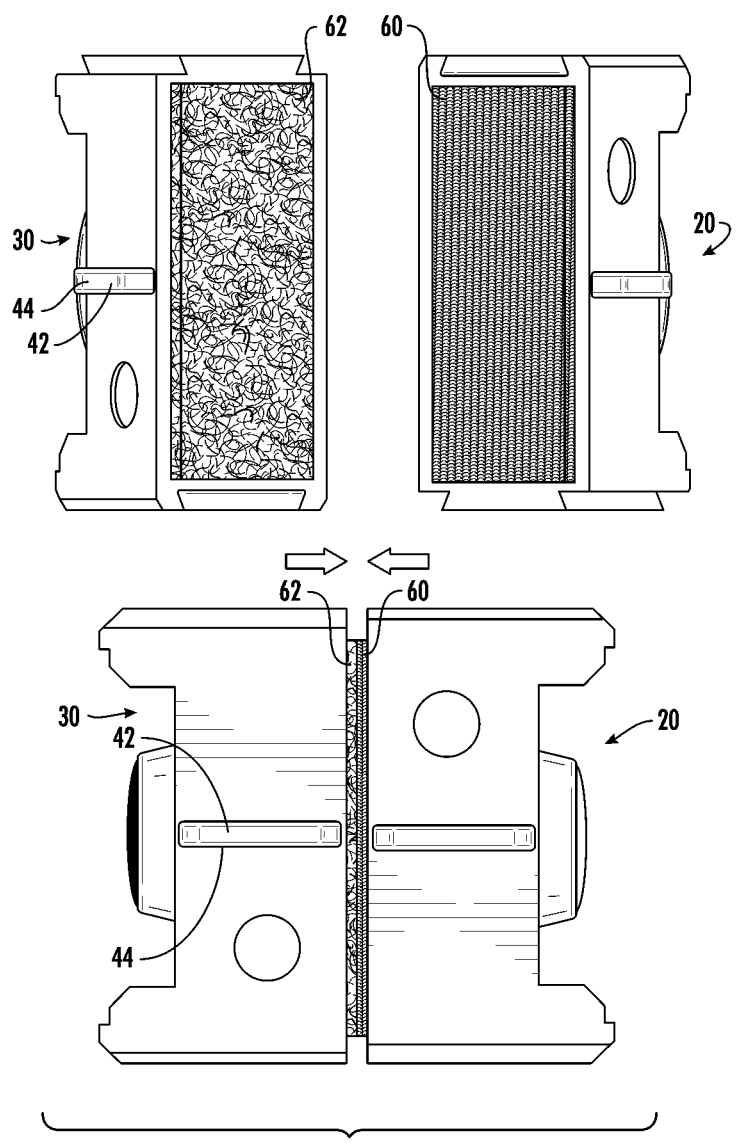
FIG. 3 illustrates another manner of connecting the two separate PTT units to each other.

Each one of the PTT units 20 and 30 includes a lanyard 40 or other securing device. The lanyard 40 can be used to secure the PTT unit 20 or 30 to the user's clothing or uniform, for example, extending through a Molle slot (not shown). As another possibility, each one of the PTT units 20 and 30 can include structure 42 (for example as shown in FIGS. 2 and 3) defining a slot 44 that can receive a Molle webbing strap. Thus, each one of the PTT units 20 and 30 can be mounted or supported on the user at a location remote from the interface unit 12.

Each one of the PTT units 20 and 30 includes at least one structural feature that enables releasable connection of that PTT unit with the other PTT unit, thereby to form one assembly at a location remote from the interface unit 12. In one embodiment the PTT units 20 and 30 include structure for forming dovetail joints. Specifically, one end of each PTT unit 20 and 30 has a dovetail 50, and the other end of the PTT unit has a dovetail socket 52. The two units 20 and 30 can thus be joined to each other as shown in FIG. 2.

In another embodiment the PTT units include a hook and loop connection. One of the PTTs unit 20 and 30 has a hook pad 60, and the other PTT unit has a loop pad 62. The two units 20 and 30 can be joined to each other as shown in FIG. 3. In some embodiments, the PTT units 20 and 30 can include both the dovetail connection and the hook and loop connection.

It can be seen that the PTT buttons 24 and 24, which are the portions of the system 10 that need to be manually accessed by the user, can by physically placed (located) on the user's body at a location different from the radio interface unit 12. For example, it is becoming common that the user wears a tablet on the user's chest. Such a placement of the tablet may interfere with placing the radio interface unit 12 on the front of the user's torso. Using a PTT system 10 in accordance with the present invention, the radio interface unit 12 can be placed on the user's back, for example, and the two PTT units 20 and 30 can be placed elsewhere in an accessible location, such as on the user's chest. In one embodiment, the cables 26 and 36 for the PTT units can be 24 inches long, for example, to allow for such placement.

Figure 4:
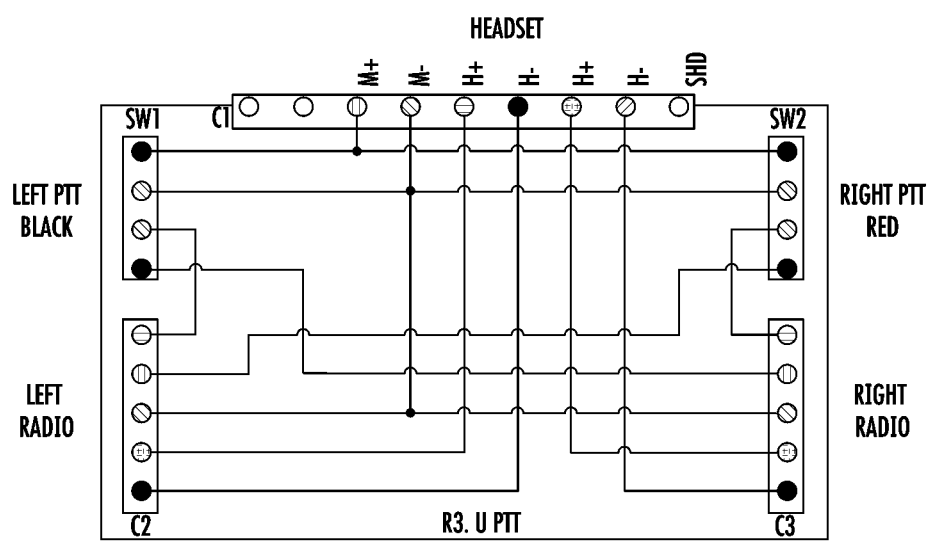
FIG. 4 is a simplified schematic drawing of the radio interface box.

FIG. 4 is a simplified schematic diagram of the electrical circuitry contained in the radio interface unit 12. The left side is the input/output from the left radio or second radio, and the right side is the input/output from the second radio or right radio. The headset connects at the top.

The invention is not limited to the embodiments described above. For example, the PTT system 10 can be configured to operate with a wireless connection between the PTT units 20 and 30 and the interface unit 12, such as Bluetooth or near field communication (NFC), so as to eliminate the wired connection. As another example, the PTT units 20 and 30 may be removably mounted on the radio interface unit 12, to enable all the parts of the system to be kept together. This can be accomplished using the dovetail mounting features 50 and 52, or the hook and loop mounting features 60 and 62, or another mounting feature. With that, the configured system 10 may more closely replicate the known systems in which the two PTT buttons are together on the radio interface unit 12. As another example, the actual PTT buttons can be mounted or supported on structure other than the illustrated box-shaped elements, perhaps even as stand-alone items. As still another example, the interface box may include or support one of the two PTT buttons, with the other PTT button being remote. Thus, the term "PTT unit" as used herein is intended to encompass any such configuration. All such modifications are included within the scope of the claims.

The invention claimed is:

1. A dual radio PTT system for a headset, comprising:
a radio interface unit that is configured for connection with a first radio to receive signals from and transmit signals to the first radio and that is configured for connection with a second radio to receive signals from and transmit signals to the second radio;
the interface unit also being configured for connection with a headset;
a first PTT unit electrically connected with the interface unit for controlling communication with the first radio; and
a second PTT unit electrically connected with the interface unit for controlling communication with the second radio;
the first and second PTT units being physically separate elements from the interface unit and being connected by separate cables to the interface unit,
wherein each one of the first and second PTT units includes structure enabling releasable connection of it to the other one of the first and second PTT units.

2. A dual radio PTT system as set forth in claim 1 wherein each one of the first and second PTT units is an element that supports a PTT button.

3. A dual radio PTT system as set forth in claim 2 wherein each one of the first and second PTT units is a box supports a PTT button.

4. A dual radio PTT system as set forth in claim 1, wherein the structure for connecting comprises a dovetail joint.

5. A dual radio PTT system as set forth in claim 1, wherein the structure for connecting comprises a hook and loop connection.

6. A dual radio PTT system as set forth in claim 1 wherein each one of the first and second PTT units includes structure for connecting it to a user's clothing.

7. A dual radio PTT system as set forth in claim 6 wherein each one of the first and second PTT units includes structure for connecting it to Molle slot.

8. A dual radio PTT system as set forth in claim 1 wherein each one of the first and second PTT units is an element that supports a PTT button, and includes structure for connecting it to the other one of the first and second PTT units, and
includes structure for connecting it to a user's clothing.

9. A dual radio PTT system for a headset, comprising:
a radio interface unit that is configured for connection with a first radio to receive signals from and transmit signals to the first radio and that is configured for connection with a second radio to receive signals from and transmit signals to the second radio;
the interface unit also being configured for connection with a headset;
a first PTT unit electrically connected with the interface unit for controlling communication with the first radio; and
a second PTT unit electrically connected with the interface unit for controlling communication with the second radio;
each one of the first and second PTT units having connection features enabling releasable connection of it with the other one of the first and second PTT units to form one assembly at a location remote from the interface unit.

10. A dual radio PTT system as set forth in claim 9 wherein the first and second PTT units are being physically separate elements from the interface unit and are connected by separate cables to the interface unit.

11. A dual radio PTT system as set forth in claim 10 wherein each one of the first and second PTT units includes structure for connecting it to a user's clothing.

12. A dual radio PTT system for a headset, comprising:
a radio interface unit that is configured for connection with a first radio to receive signals from and transmit signals to the first radio and that is configured for connection with a second radio to receive signals from and transmit signals to the second radio;
the interface unit also being configured for connection with a headset;
a first PTT unit electrically connected with the interface unit for controlling communication with the first radio; and
a second PTT unit electrically connected with the interface unit for controlling communication with the second radio;
each one of the first and second PTT units having mounting features configured to enable it to be mounted to and supported on the user at a location spaced apart from the interface unit,
wherein each one of the first and second PTT units includes structure enabling releasable connection of it to the other one of the first and second PTT units.

13. A dual radio PTT system as set forth in claim 12 wherein each one of the first and second PTT units includes structure for connecting it to a user's clothing.

14. A dual radio PTT system as set forth in claim 13 wherein each one of the first and second PTT units includes structure for connecting it to Molle slot.

15. A dual radio PTT system as set forth in claim 12 wherein the first and second PTT units are being physically separate elements from the interface unit and are connected by separate cables to the interface unit.

* * * * *